N. F. POTTER.
Peat Machine.
No. 47,331.
Patented April 18, 1865.
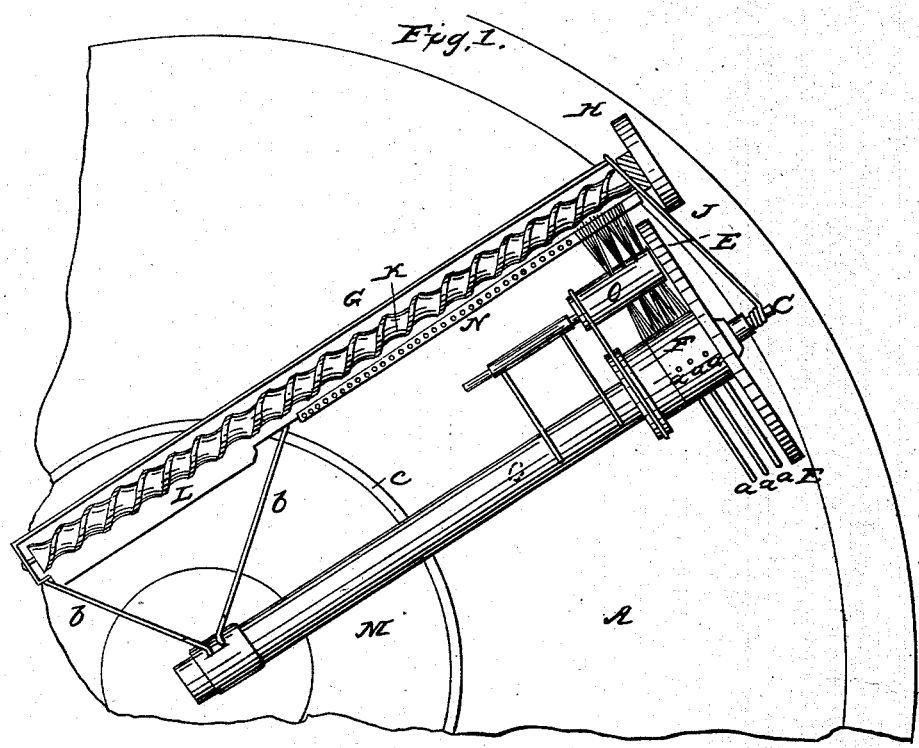
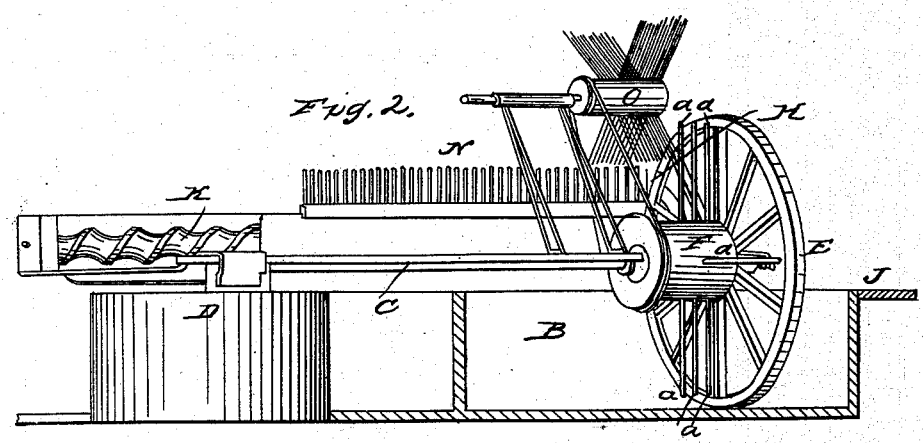

UNITED STATES PATENT OFFICE.

NATHANIEL F. POTTER, OF PROVIDENCE, RHODE ISLAND.

IMPROVED MACHINE FOR TEMPERING AND PREPARING PEAT.

Specification forming part of Letters Patent No. 47,331, dated April 18, 1865.

*To all whom it may concern:*

Be it known that I, NATHANIEL F. POTTER, of the city and county of Providence, in the State of Rhode Island, have invented a new and useful Improvement in Machines for Tempering and Preparing Peat for Fuel; and I do hereby declare that the following specification, taken in connection with the drawings making a part of the same, is a full, clear, and exact description thereof.

Figure 1 is a top view of the machine for tempering clay and preparing it for bricks, patented to Nathaniel Adams, December 16, A. D. 1833, with my improvements, adapting the same for the working of peat, attached, the drawing, however, for the sake of convenience, exhibiting only a quadrant of the circular mill employed by the said Adams. Fig. 2 is a front elevation of the working parts of the mill with my improvements attached.

The importance of peat as an article of fuel has recently attracted much attention, in consequence of the high price which anthracite coals and other fuels command.

Peat, in its crude state, has long been used extensively by the peasantry of Ireland and Scotland, and to a very limited extent in this country; but in order to make it an article of much commercial value it is necessary to free the rich vegetable mold from the undecomposed vegetable fiber with which it abounds, as well as to compress it into a compact mass and free it by pressure and by evaporation from the water with which it is saturated.

The purpose of the invention which is the subject of this patent is to provide a means for removing all undecomposed vegetable fiber while the mass is undergoing the process of tempering or being rendered homogeneous, preparatory to the operation of forcing it into cakes for drying. The machine specially adapted for performing this latter operation is the subject of other Letters Patent of even date herewith; but the present invention relates solely to the improvement in the manufacture above mentioned.

In the accompanying drawings, A, Fig. 1, represents a quadrant of the machine for tempering clay for bricks, patented to Nathaniel Adams, December 16, A. D. 1833, which consists of a circular bed, A, surrounded by a rim, B, Fig. 2. C is a sweep radiating from a central shaft, D, Fig. 2, and of a sufficient height above the plane of the bottom of the bed to accommodate the tempering-wheel E, which turns upon the sweep as an axle. By a familiar arrangement (shown in the patent of Adams, referred to) this tempering-wheel, as the sweep is turned, is made to gradually approach the central shaft, and then as gradually, by the shifting of the gearing, return toward the rim of the mill, and thus during its spiral path of travel cut up and render homogeneous, or "temper," as it is termed, the mass of clay upon which it acts. I adopt this machine for the purpose of performing the same operation upon the peat and operate it to accomplish the tempering process in all respects as in the instance of working clay preparatory to molding the same into bricks. To remove, however, the fibrous material which pervades the peat, I have added the following devices and combinations:

I extend the hub F of the wheel E, enlarging it beyond what would otherwise be necessary, so as to form a drum. This drum I furnish with comb-teeth *a a a*, which should be sufficiently unyielding to be forced through the mass of peat, and may be flattened so as to present a blunt cutting-edge to diminish the effect of resistance. In front of the sweep C, parallel with it, and so arranged that it shall travel as the sweep travels by being connected at the farther and at the hither end therewith by supporting-braces *b b*, as shown, I arrange a trough, G, Fig. 1, which has a collar at the farther end, within which is fitted the axle of the supporting-wheel H, which runs upon a flange, I, upon the top of the rim B. This trough has throughout its entire length the Archimedean screw K, which is mounted upon a bearing at the hither end of the trough, and is at the outer end attached to the hub of the wheel H. A portion of the trough nearest the center of the mill is provided with a delivery spout or lip, as shown at L, so that the material carried along by the screw will be allowed to be delivered into the waste tub or reservoir M, formed by the partition *c* around the axis of the mill. Upon the side of the trough G nearest to the wheel E, I place a series of comb-teeth, N, Fig. 2, which extend from the outer end of the trough toward the hither end as far as the tempering-wheel E travels. Midway between this row of comb-teeth and the sweep C, but raised above both, as shown in Fig. 2, is placed the revolving brush O, mounted in suitable bearings. This brush may be provided with bristles or with flexible wires, and can be made to revolve as the sweep C turns, by means of a driving-belt passing over the drum F of the tempering-wheel E. The bristles, or their equivalents, of which the brush is composed should be of sufficient length to pass, as the brush revolves, between the teeth *a a a* upon the drum F, and also the teeth of the comb N upon the trough.

The operation of the machine is as follows: As the sweep turns around the axis D, the tempering-wheel E will commence its work upon the peat, and the comb-teeth *a a a* will at the same time be forced through every part of the mass, and will take up all the undecomposed fibers or vegetable material which may be in their path. All such material will be borne upward by the comb teeth, between which it will be more or less entangled until the bristles or their equivalents of the brush O—which, it will be observed, revolves in the same direction with the drum F—wipe the same out from the teeth and deposit it in the trough G, the teeth of the comb N acting, in combination with the revolving brush, to strip the bristles clear of all fiber and refuse material. The refuse matter having been deposited, as described, in the trough G, it is carried along by the Archimedean screw K, which, by the friction of the wheel H upon its track I, is made constantly to revolve, as the sweep C is turned, until it is brought to the point at L, where it is discharged into the reservoir M. In this way not only will all roots, vegetable fiber, and waste matter be removed from the peat, but at the same time the mass will be tempered in readiness for molding into cakes, the comb-teeth, in addition to their office as extractors of the woody fiber, greatly assisting the tempering-wheel E in the performance of its office by breaking up and intermixing the particles of the peat.

I do not limit myself to the particular construction or arrangement of the several parts of my improvement, as described; but I mean to include all mere formal variations of structure and arrangement performing in combination the same mode of operation by equivalent means.

What I claim as my invention, and desire to secure by Letters Patent, is—

1. The use of a series of combing-teeth, *a a a*, or their equivalents, operating upon the mass of peat to remove the undecomposed vegetable fiber, in the manner and on the principle substantially as described.

2. The combination of a brush or a series of brushes, O, or clearers, with the combing-teeth *a a a*, substantially as described, for the purposes specified.

3. The employment of a series of comb-teeth, N, arranged substantially as shown, in combination with the brush or series of brushes O, for the purposes described.

4. The method, substantially as described, of separating the vegetable fiber from a mass of crude peat and transferring the same to a place where it can be removed by the combination of the movable set of comb-teeth *a a a*, the stationary set of comb-teeth N, and the clearing and delivering brushes O, as herein set forth.

5. The use of a receiving-trough, G, or its equivalent, provided with the Archimedean screw K, arranged and operating to receive the refuse vegetable material extracted from the peat, and to deliver the same to a suitable receptacle, as described.

6. The combination of such receiving and delivering apparatus with the apparatus for extracting and transferring the refuse vegetable material to the same, as herein described.

NATHANIEL F. POTTER.

Witnesses:
JOHN H. STINESS,
W. B. VINCENT.